(12) United States Patent
Koep

(10) Patent No.: US 10,573,931 B2
(45) Date of Patent: Feb. 25, 2020

(54) INTERCALATED LITHIUM BATTERIES

(71) Applicant: S2 Batteries, Houston, TX (US)

(72) Inventor: Erik K. Koep, Houston, TX (US)

(73) Assignee: S2 BATTERIES, Paradise Valley, AZ (US)

( * ) Notice: Subject to any disclaimer, the term of this patent is extended or adjusted under 35 U.S.C. 154(b) by 211 days.

(21) Appl. No.: 14/990,307

(22) Filed: Jan. 7, 2016

(65) Prior Publication Data

US 2016/0118693 A1 Apr. 28, 2016

Related U.S. Application Data

(62) Division of application No. 13/777,922, filed on Feb. 26, 2013, now Pat. No. 9,450,239.

(Continued)

(51) Int. Cl.
*H01M 10/0562* (2010.01)
*H01M 10/058* (2010.01)
(Continued)

(52) U.S. Cl.
CPC ............. *H01M 10/058* (2013.01); *C23C 4/11* (2016.01); *C23C 4/129* (2016.01); *H01M 2/145* (2013.01); *H01M 2/1673* (2013.01); *H01M 4/0407* (2013.01); *H01M 4/0421* (2013.01); *H01M 4/0426* (2013.01); *H01M 4/0428* (2013.01); *H01M 4/131* (2013.01); *H01M 4/133* (2013.01); *H01M 4/136* (2013.01); *H01M 4/1391* (2013.01); *H01M 4/48* (2013.01);

(Continued)

(58) Field of Classification Search
CPC ....... H01M 2/16; H01M 2/14; H01M 10/0562
See application file for complete search history.

(56) References Cited

U.S. PATENT DOCUMENTS

| 8,007,758 B2 | 8/2011 | Stark et al. |
| 2003/0008213 A1 | 1/2003 | Cho |

(Continued)

FOREIGN PATENT DOCUMENTS

| DE | 2005038351 | 2/2007 |
| DE | 2007041513 | 3/2009 |

(Continued)

OTHER PUBLICATIONS

Birke, A First approach to a monolithic all solid state inorganic lithium battery, Solid State Ionics 118, 149-157 (Dec. 1997).

(Continued)

*Primary Examiner* — James Lee
(74) *Attorney, Agent, or Firm* — ColterJennings

(57) ABSTRACT

An intercalated lithium battery that has been fabricated in open air with a thin dense layer of amorphous solid-state lithium borate electrolyte deposited directly onto a negative electrode via flame spray pyrolysis. In one embodiment, the negative electrode is attached to a prefabricated positive electrode via hot pressing (embossing), thus forming an intercalated lithium battery. The method significantly improves upon current methods of fabricating thin film solid state batteries by permitting fabrication without the aid of a controlled environment, thereby allowing for significantly cheaper fabrication than prior batch methods.

5 Claims, 8 Drawing Sheets

Related U.S. Application Data

(60) Provisional application No. 61/611,139, filed on Mar. 15, 2012.

(51) Int. Cl.

| | |
|---|---|
| *H01M 10/0585* | (2010.01) |
| *H01M 10/0525* | (2010.01) |
| *H01M 2/14* | (2006.01) |
| *H01M 2/16* | (2006.01) |
| *H01M 4/48* | (2010.01) |
| *C23C 4/11* | (2016.01) |
| *C23C 4/129* | (2016.01) |
| *H01M 4/04* | (2006.01) |
| *H01M 4/131* | (2010.01) |
| *H01M 4/133* | (2010.01) |
| *H01M 4/136* | (2010.01) |
| *H01M 4/1391* | (2010.01) |
| *H01M 4/505* | (2010.01) |
| *H01M 4/525* | (2010.01) |
| *H01M 4/58* | (2010.01) |
| *H01M 4/587* | (2010.01) |

(52) U.S. Cl.
CPC .......... *H01M 4/483* (2013.01); *H01M 4/505* (2013.01); *H01M 4/525* (2013.01); *H01M 4/58* (2013.01); *H01M 4/587* (2013.01); *H01M 10/0525* (2013.01); *H01M 10/0562* (2013.01); *H01M 10/0585* (2013.01); *H01M 2300/0071* (2013.01)

(56) References Cited

U.S. PATENT DOCUMENTS

| | | |
|---|---|---|
| 2004/0023106 A1 | 2/2004 | Benson et al. |
| 2006/0024587 A1 | 2/2006 | Tamura et al. |

FOREIGN PATENT DOCUMENTS

| | | | |
|---|---|---|---|
| WO | 200072398 | 11/2000 | |
| WO | 2005124919 | 12/2005 | |
| WO | 2006012575 | 2/2006 | |
| WO | WO-2011140327 A2 * | 11/2011 | .......... C01B 35/121 |

OTHER PUBLICATIONS

Brodd, Factors Affecting U.S. Production Decisions: Why are There No Volume Lithium-Ion Battery Manufacturers in the United States?, ATP Working Paper Series Working Paper 05-01 (Jun. 2005).
Can, Electrical and optical properties of Li-doped LiBOa and LiNb03 films, Journal of Applied Physics 76, 4327 (1994).
Goldner, Development of a Thin Film LiCoo/LiC Rocking-Chair Batteries, Electrochemical Society Proceedings, vol. 95-22.
Horopantis Electrical Properties of Lithiated Boron Oxide Fast-ion Conducting Glasses, Ionics 9 (2003).
Huang, Vibrational spectroscopic and electrochemical studies of the low and high temperature phases of LiCo, MO . . . , Solid State Ionics 86-88 (1996).
Hunt, Combustion chemical vapor deposition: A novel thin-film deposition technique, Appl. Phys. Lett. 63 (Jul. 12, 1993).
Inada, Fabrications and properties of composite solid-state electrolytes, Solid State Ionics 158 (2003) 275-280.
Joo, Thin film lithium ion conducting LiBSO solid electrolyte, Solid State Ionics 160 (2003) 51-59.
Kanehori, Thin Film Solid Electrolyte and Its Application to Secondary Lithium Cell, Solid State Ionics 9 & I0 (1983) 1445-1448.
Kang, Electrochemical and structural properties of HT-LiCoO2 and LT-LiCoO2 prepared by the citrate sol-gel method, Solid State Ionics 120 (1999) 155-161.
Karan, Structural and lithium ion transport studies in borophosphate glasses, Solid State Ionics 177 (2006) 1429-1436.
Kuhn, Li Ion Diffusion in Nanocrystalline and Nanoglassy LiAlSi2O6 and LiBO2-Structure—Dynamics Relations in Two Glass Forming COmpounds, Z/ Phys. Chem. 223, 1359-1377 (2009).
Lee, Modification of network structure induced by glass former composition and its correlation to the conductivity in lithium borophosphate glass for solid state electrolyte, Solid State Ionics 178 (2007) 375-379.
Lei, Pressure-induced coordination changes in LiBO2, Journal of Solid State Chemistry 182 (2009) 3041-3048.
Mathews, High-temperature behavior of lithium borates: Part I: Characterization and thermal stability, Thermochimica Acta 320 (1998) 89-95.
Mathews, High-temperature behavior of lithium borates Part II: High-temperature X-ray diffractionometric and dilatometric studies, Thermochimica Acta 319 (1998) 113-121.
McMillen, The hydrothermal synthesis, growth, and optical properties of g-LiBO2, Journal of Crystal Growth 310 (2008) 299-305.
Minami, Comparison of Ionic Conductivity Between Glassy and Crystalling Solid Electrolytes in the System Agl—AG2O—MoO3, Journal of the American Cerasmic Society, Sep.-Oct. 1977, pp. 467-469.
Munoz, Increased electrical conductivity of LiPON glasses produced by ammonolysis, Solid State Ionics 179 (2008) 574-579.
Navone, A kinetic study of electrochemical lithium insertion into oriented V2O5 thin ?lms prepared by rf sputtering, Electrochimica Acta 53 (2008) 3329-3336.
Thackeray, Lithiated Oxides for Lithium-Ion Batteries, paper to bepresented at The 186th Meeting, The Electrochemical Society Symposium, Oct. 9-14, 1994.
Tsuruhama, Preparation of Layered-Rhombohedral LiCoO2 Epitaxial Thin Films Using Pulsed Laser Deposition, Applied Physics Express 2 (2009) 085502.
Vaish, Crystallization Kinetics and Electrical Relaxation of BaO—0.5Li O—4.5B2O3 Glasses, J. Am. Ceram. Soc., 92 [9] 1993-1998 (2009).

* cited by examiner

FIGURES 8a-f

INTERCALATED LITHIUM BATTERIES

CROSS-REFERENCE TO RELATED APPLICATIONS

This application is a divisional of U.S. patent application Ser. No. 13/777,922 filed Feb. 26, 2013 titled "Methods for Fabrication of Intercalated Litium Batteries," which in turn claims priority based on U.S. Provisional Patent Application Ser. No. 61/611,139 filed Mar. 15, 2012 and titled "Open Air Method for the Fabrication of Intercalated Lithium Batteries," the entire disclosures of both of which are incorporated herein by this reference.

BACKGROUND

This invention relates to manufacturing of lithium batteries, and in particular a process that may be employed in an open environment.

Batteries are comprised of a positive and a negative electrode separated by an ionically conductive, but electrically insulating, electrolyte. Secondary batteries are further defined by reversible electrochemical reactions. Secondary batteries come in a wide variety of types and sizes, but are generally defined by the mobile ion. Thus, lithium secondary batteries typically rely upon conduction of the mobile lithium ion, $Li^+$.

Typically, liquid electrolyte lithium batteries are fabricated under vacuum conditions because both the electrolyte, such as $LiPF_6$, and the metallic lithium negative electrode react violently with moisture in the ambient atmosphere. Solid state lithium batteries are also manufactured under vacuum conditions due to two important factors. First, the most popular electrolyte and electrode materials for solid state batteries also react with moisture. In fact, many thin film batteries use lithium metal as the negative electrode and Lithium cobaltite ($LiCoO_2$) as the positive electrode. Second, solid state batteries depend on an amorphous thin film electrolyte, for which there are few known methods of fabrication.

Previous studies of thin film lithium batteries often focused on the use of lithium phosphorus oxynitride (LiPON) as the electrolyte. The relatively high ionic conductivity and stability in contact with metallic lithium make LiPON a popular choice. Ionic conductivity, however, is heavily dependant on the nitrogen content and thus is limited to vacuum deposition methods.

Two alternate electrolyte materials, lithium metaborate (LiBO2) and lithium sulfide (Li2S) glasses, have also been found to be good lithium ion conductors. Although they provide good conductivity, sulfide glasses tend to be unstable both in contact with lithium metal and under atmospheric conditions. LiBO2 electrolytes have also been found to be unstable with lithium metal but do not typically have similar problems under atmospheric conditions. It was also been found that phosphorous additives, such as P2O5, can further increase the ionic conductivity.

Similar to liquid electrolyte batteries, most solid state lithium batteries utilize metallic lithium as a negative electrode. Metallic lithium is popular because it supplies a high electrochemical potential and thus open circuit voltage (OCV). Although toxic, corrosive and flammable, lithium metal can be manipulated under a controlled environment.

Alternatively, thin film batteries can be developed as an intercalated, or rocking chair, battery. The intercalated battery is a specific type of secondary lithium battery in which both the anode and cathode are formed with intercalation compounds rather than metallic lithium. In this case, the elemental lithium is impregnated, or intercalated, in an oxide rather than applied directly. The lithium ions then move back and forth between interstitial sites as the battery is charged and discharged. While this often reduces the open circuit voltage (OCV) of the cell, intercalated batteries have found niche applications due to improved safety characteristics and power-to-weight ratios.

More recently, lithium impregnated materials have been investigated as potential electrode materials. In 1995 it was shown that the high temperature phase of LiCoO2 shows good stability and reversibility. Oriented vanadium (III) oxide has also been shown to be a potential electrode material.

For solid electrolytes, amorphous thin films are typically preferred because grain boundaries tend to inhibit lithium ion movement within the electrolyte. Because lithium is propagated in solid state ionic conductors by an interstitial method, amorphous or nanocrystalline materials show consistently higher ionic conductivity than do their crystalline counterparts. Unfortunately, only select techniques are capable of depositing thin amorphous films. To this point, the deposition of dense, amorphous, lithium-containing films has often used vacuum or controlled environment processes.

In the last several years, numerous thin film lithium batteries have been developed and commercialized. Thin films are usually considered to be less than 10 microns thick. The Handbook of Thin-Film Deposition Processes and Techniques (Noyes Pubs. 1988; Schuegraf, K. K. editor) provides a broad review of thin-film deposition techniques. These technologies include chemical vapor deposition, pulsed laser deposition, e-beam evaporation and DC/RF sputtering.

Some of the first thin film lithium batteries were developed based on an amorphous lithium phosphosilicate electrolyte. Unfortunately this electrolyte was unstable in contact with metallic lithium and little progress was made until the advent of lithium phosphorus oxynitride (LiPON). LiPON electrolytes were found to be stable up to 5.5V versus lithium metal, which encouraged the development of experimental prototypes. Lithium boride (LiBO2) and lithium sulfide (Li2S) glasses were also found to be good lithium ion conductors. While providing excellent conductivity, sulfide glasses were shown to be unstable both in contact with lithium metal and under atmospheric conditions. In contrast, LiBO2 electrolytes were found to be unstable with lithium metal but did not have similar problems under atmospheric conditions.

A variety of intercalated electrodes were developed to replace lithium metal. In 1995 it was shown that the high temperature phase of $LiCoO_2$ shows good stability and reversibility. More recently oriented Vanadium (III) Oxide was shown to be a potential electrode material.

Solid state intercalated lithium batteries are typically manufactured in a controlled environment using thin film deposition methods such as chemical vapor deposition, pulsed laser deposition, DC/RF magnetron sputtering or e-beam evaporation. Such time and energy intensive methods are required due to the material choices and the difficulty in producing amorphous lithium ion conductors. However, thin film intercalated lithium batteries could be produced much more cheaply and efficiently if thin film, amorphous electrolytes could be developed in the ambient atmosphere.

SUMMARY

The present disclosure provides a method for manufacturing an intercalated lithium battery in an open environment. In contrast to prior methods, the present method uses combustion chemical vapor deposition ("CCVD"), also known as flame spray pyrolysis, to deposit $LiBO_2$ electrolytes. The method takes advantage of the fact that $LiBO_2$ films deposited between 850° C. and 1000° C. are dense, amorphous and stoichiometrically precise. Because CCVD does not require a controlled atmosphere, the present method can be performed in open air. When combined with intercalated electrodes, a solid state lithium battery may be fabricated entirely in the ambient atmosphere. Ultimately, this should reduce fabrication costs and increase process speeds by allowing battery manufacturers to switch from a batch process to a continuous rolling process.

The present method includes a multi-step method for the fabrication of intercalated lithium batteries in open air. First, a negative current collector and negative electrode (or anode) assembly is prefabricated. Next, an amorphous, dense lithium boride electrolyte is deposited atop the negative electrode via flame spray pyrolysis. The thickness of this film is typically between 100 nm and 50 µm and is sufficiently continuous to prevent contact between the positive and negative electrodes.

Next, the positive electrode (or cathode) is deposited on top of the lithium boride electrolyte to form a negative current collector/negative electrode/electrolyte/positive electrode assembly. Finally, a positive current collector is deposited atop the positive electrode assembly to form a working lithium battery having the cross-sectional structure negative current collector/negative electrode/electrolyte/positive electrode/positive current collector. Alternatively, the negative electrode/negative current collector assembly may also be prefabricated and bonded directly to the positive current collector/positive electrode/electrolyte assembly. Of special note is that all parts of this process are developed in the ambient atmosphere.

Specifically, according to the present method, an intercalated lithium battery is produced in an ambient atmosphere by first providing a substrate to serve as the negative electrode. The substrate has at least one surface that may be coated. The substrate may be formed from a variety of materials, such as $LiCoO_2$, the principal requirements being that the substrate be electrically conductive and capable of holding or storing lithium, because the battery stores lithium on both the anode and the cathode, depending on the state of charge of the battery.

An amorphous layer of $LiBO_2$ (lithium metaborate) is formed by CCVD. The process begins by mixing a solution of a combustible fluid (typically an alcohol solution, such as ethanol methanol, or isopropanol) with fluid-soluble lithium and boron compounds. Examples of such compounds are $LiNO_3$ and $BCl_3$. The lithium and boron compounds dissolve in the fluid to form a reagent mixture. The reagent mixture is sprayed through a nozzle to a liquid spray containing the reagent mixture. The spray passes through a flame to combust the reagent mixture, thereby forming heated lithium metaborate.

The lithium metaborate deposits onto the substrate at a temperature between 750 C and 1100 C, where it cools to form an amorphous lithium metaborate coating on the substrate. The substrate is removed from the flame following deposition, and adhered to a positive electrode, for example by hot pressing. The result is an intercalated lithium battery. Alternatively, the positive electrode can be directly deposited atop the electrolyte by any thin film deposition method, such as CCVD, CVD or sputtering.

There are several alternative ways of producing the battery. For example, the order in which the positive and negative electrodes are deposited may be reversed. The positive electrode may be made of one of several common positive electrode materials, such as is $V_2O_5$, $LiCoO_2$, manganese spinel, lithiated transition metal oxide compounds, $LiNiO_2$ or lithium manganese oxide. The negative electrode may be any of several common electrodes, such that the standard potential of the negative electrode is sufficiently less than that of the positive electrode. Common negative electrodes are $LiCoO_2$, carbon black, graphite, graphene, carbon nanotubes, silicon carbide or disordered carbon compounds.

BRIEF DESCRIPTION OF THE DRAWINGS

Other features and advantages of the present invention will be apparent from reference to the following Detailed Description taken in conjunction with the accompanying Drawings, in which.

DETAILED DESCRIPTION

According to one embodiment, the present method deposits an amorphous film of $LiBO_2$ (lithium metaborate) as an electrolyte directly onto an active electrode substrate, such as $LiCoO_3$ or $V_2O_5$. The method may use combustion chemical vapor deposition ("CCVD"), sometimes known as Flame Spray Pyrolysis. The film may be deposited at different temperatures.

Figure 1:
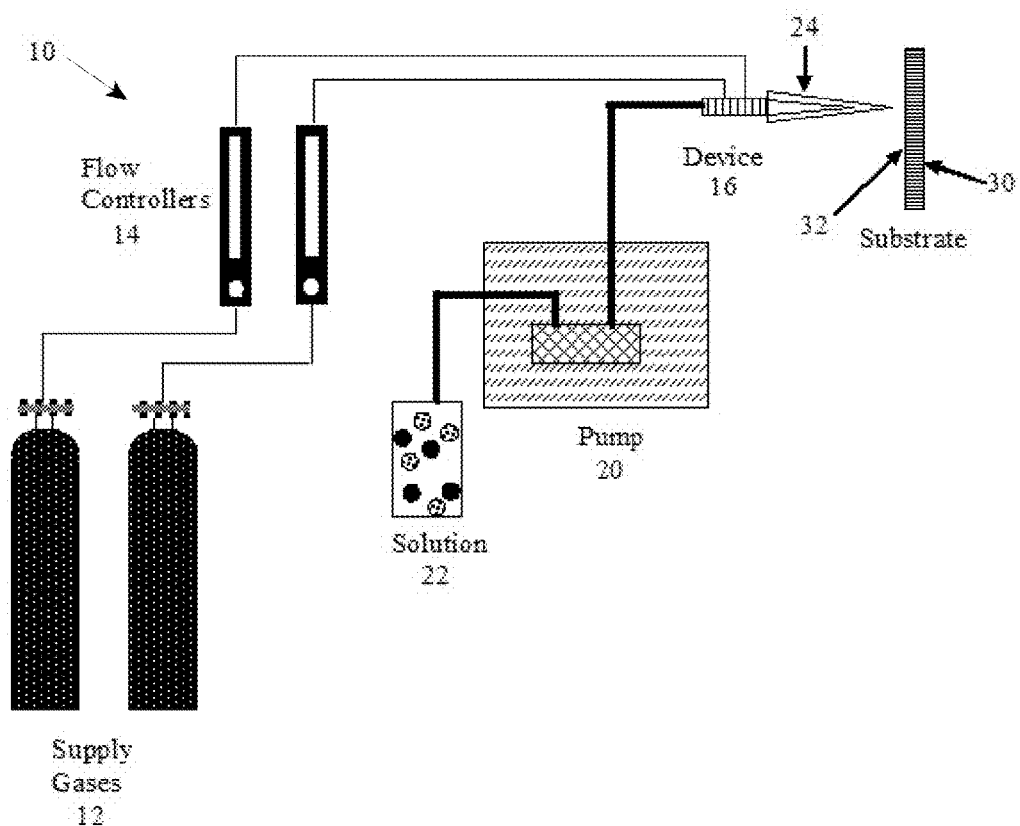
FIG. 1 depicts a schematic diagram of a deposition apparatus according to one embodiment.

As depicted in FIG. 1, a deposition apparatus 10 includes supply tanks 12 that pass combustion fuel gases through flow controllers 14 to a combustion device 16, which burns the supply gases. At the same time, a pump 20 pumps a reagent mixture 22 through the burning flame 24. The reagent mixture is ignited, thereby converting the precursors into $LiBO_2$ in flight. The material then lands on the substrate 30 and cools, thereby forming a thin film 32.

Figure 2:
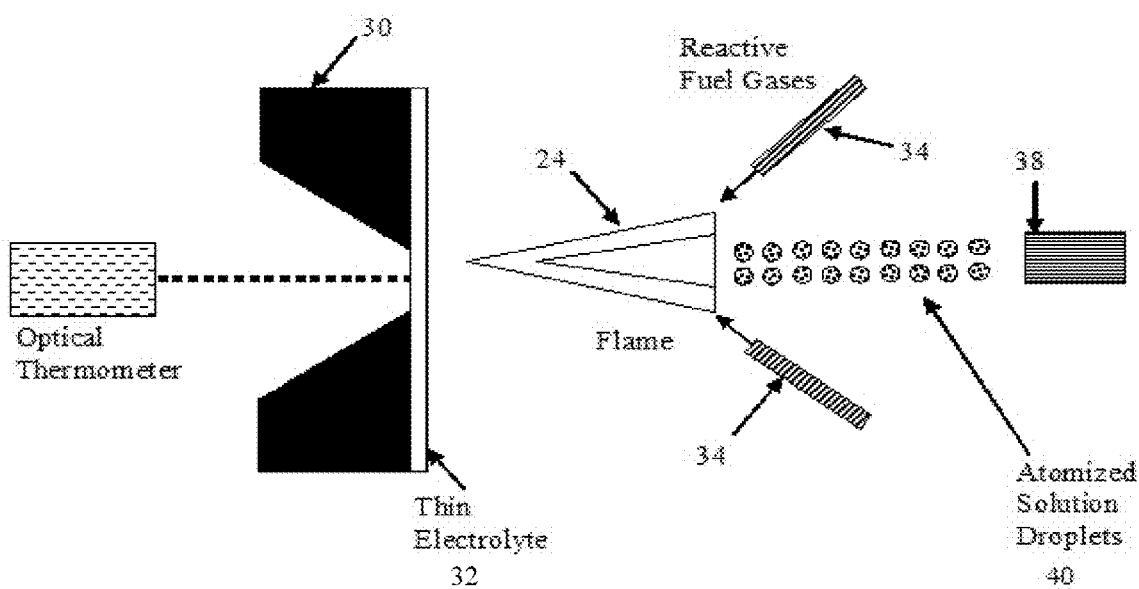
FIG. 2 depicts a schematic diagram of a portion of the deposition apparatus of FIG. 1.

FIG. 2 depicts a closer view of the deposition process. As can be seen, the supply gases pass through outlets 34 and are ignited to form the flame 24. The reagent mixture is formed by mixing a solution of a combustible fluid (typically an alcohol having small amounts of water, such as ethanol, methanol, or isopropanol) with fluid-soluble lithium ($LiNo_3$) and boron ($BCl_3$) compounds. The lithium and boron compounds dissolve in the fluid to form a reagent mixture. The reagent mixture is sprayed through the nozzle 38 to form a liquid spray containing the reagent mixture. Atomized droplets 40 of the reagent mixture pass through the flame 24, thereby forming heated lithium metaborate droplets. The heated droplets are then deposited onto a substrate 30 to form a thin film 32 of $LiBO_2$. When the substrate is an active electrode, such as $LiCoO_2$ or graphite, the $LiBO_2$ acts as an electrolyte.

When lithium metaborate deposits onto the substrate at a temperature between 750 C and 1100 C, the resulting film may be amorphous. The substrate is removed from the flame following deposition, and the $LiBO_2$ coated side of the assembly is adhered to a positive electrode, for example by hot pressing, CCVD or chemical vapor deposition. The result is an intercalated lithium battery.

Figure 3:
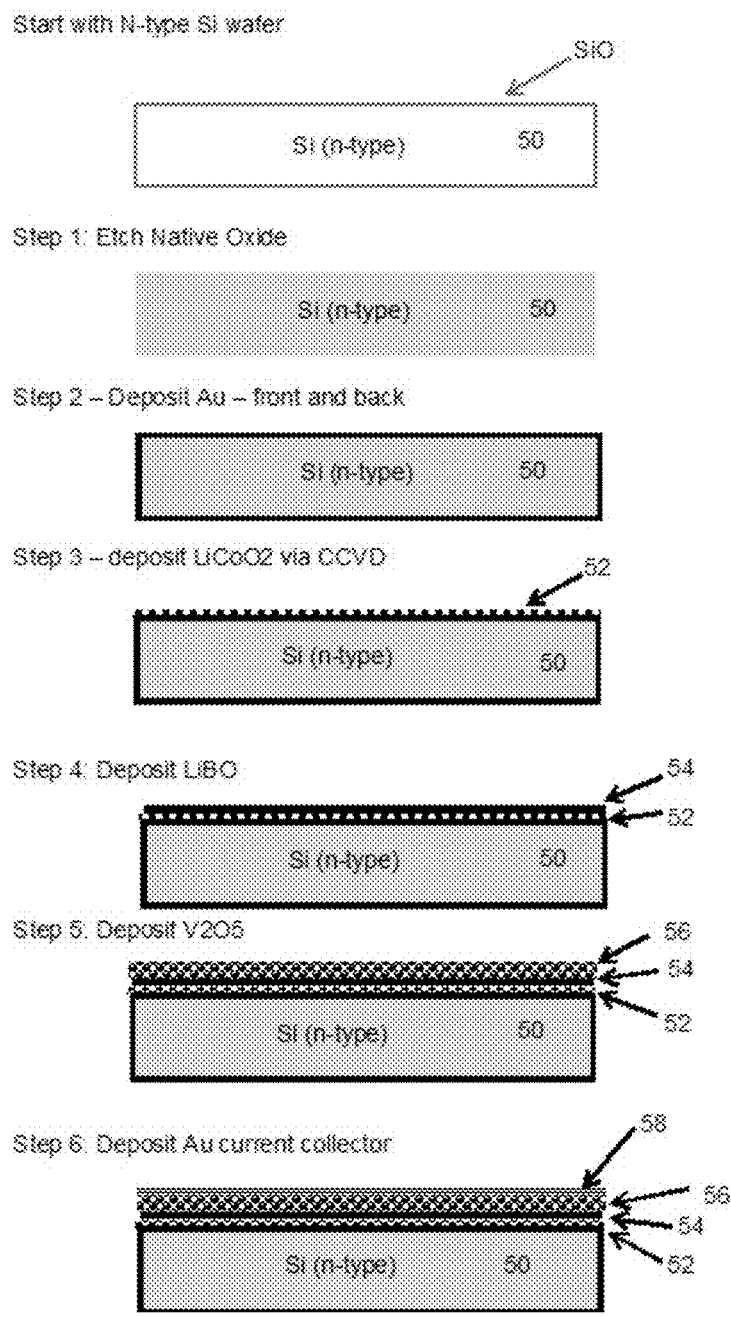
FIG. 3 depicts a schematic view of the steps of the present process according to one embodiment.

FIG. 3 schematically depicts the steps used to make the intercalated battery according to one embodiment of the present methods. The method begins with an N-type silicon wafer 50. The wafer 50 is etched (Step 1), and gold deposited over the entire surface of the wafer. A layer 52 of LiCoO2 is then deposited on the wafer 50 (Step 3) using CCVD, and a LiBO layer 54 deposited on top of the LiCoO2 (Step 4), as previously discussed with respect to FIGS. 1 and 2. A layer 56 of $V_2O_5$ is deposited onto the wafer (Step 5), following which a gold current collector 58 is deposited (Step 6), completing the basic battery construction steps.

Figure 4:
FIG. 4 is a photograph of a $Au/Si/Au/LiCoO_2/LiBO_2/V_2O_5/Au$ test cell.

FIG. 4 is an optical photograph of the Au/Si/Au/$LiCoO_2$/$LiBO_2$/$V_2O_5$/Au test cell. The test cell measured approximately 5 mm×5 mm×0.5 mm, 97% of which was inactive substrate. The thin film nature of the cell allows it to be deposited on a variety of substrates for maximum utility.

Figure 5:
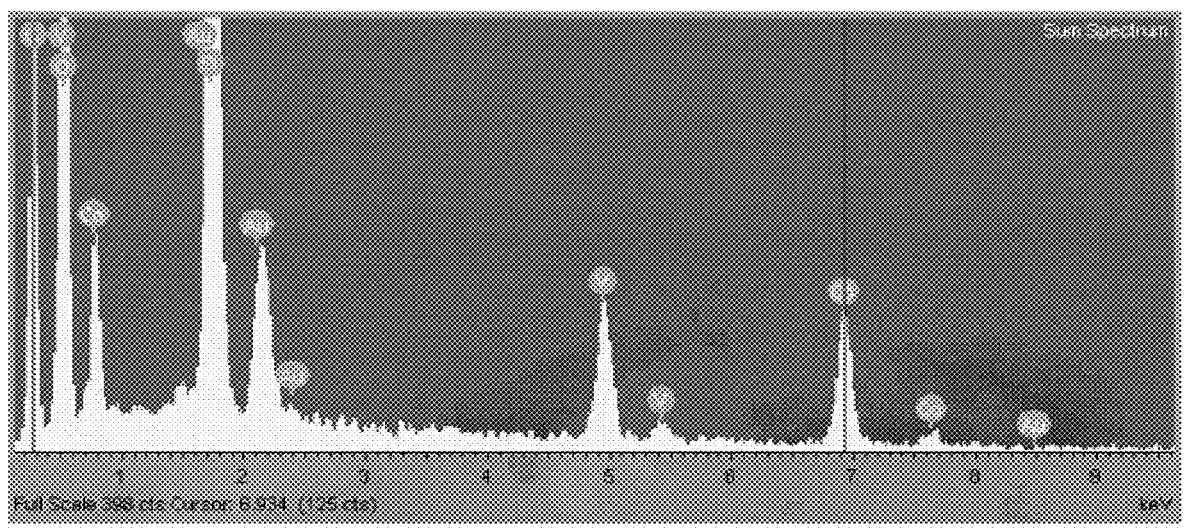
FIG. 5 is an energy dispersive X-ray spectrograph of the test cell of FIG. 4.

FIG. 5 is an energy dispersive X-ray spectrograph of the test cell. Sharp peaks associated with polycrystalline cobalt can be seen at approximately 0.8 keV and 6.9 keV. Similarly, peaks associated with polycrystalline vanadium are evident at 4.9 and 5.4 keV. Lithium does not show up as it is too small to be imaged effectively by EDXS while the boron is contained in an amorphous film, rendering it invisible to X-ray analysis.

Initial Performance Curves

Figure 6:
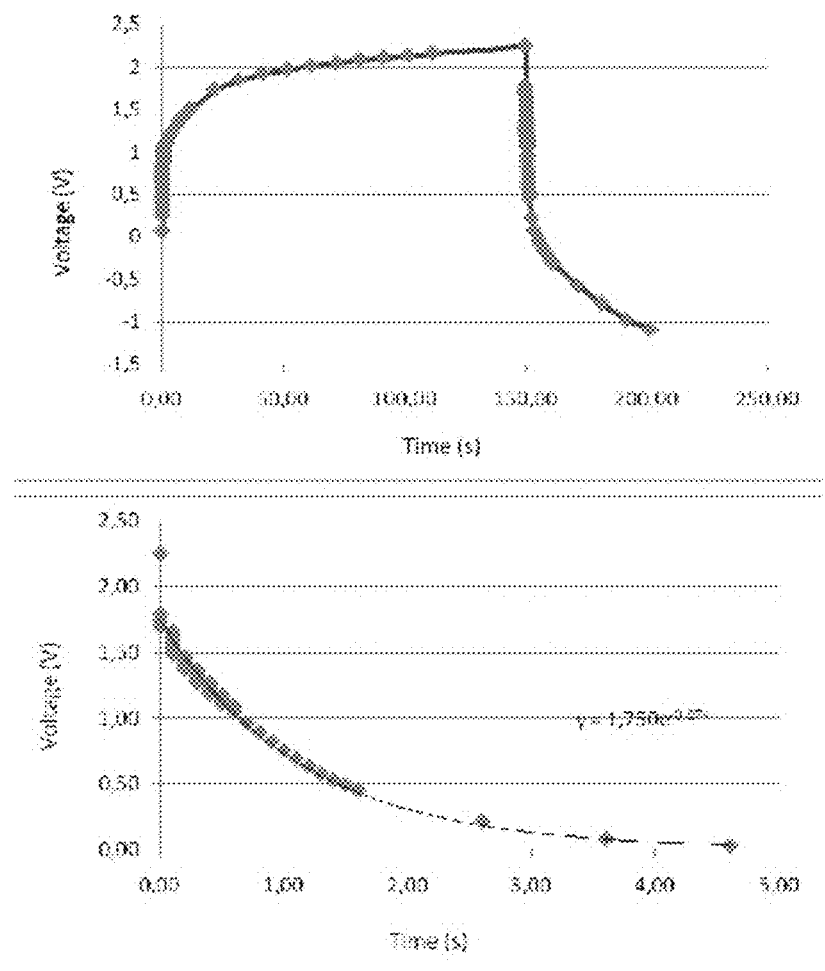
FIG. 6 shows chronoamperometry curves of the test cell of FIG. 4.
Figure 7:
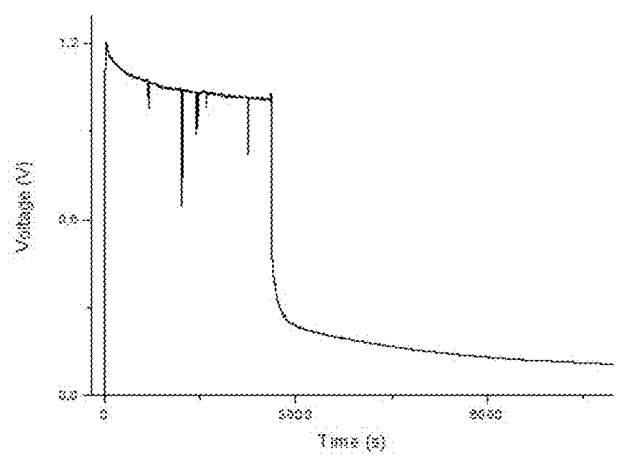
FIG. 7 is a self-discharge curve of the cell of FIG. 4.

FIG. 6 shows chronoamperometry curves of the Au/Si/Au/LiCoO2/$LiBO_2$/V2O5/Au test cell. For these measurements, the current was held at +1 µA for 150 s and subsequently reversed to −1 µA for 50 s. FIG. 7 is a self-discharge curve of the test cell shown in FIG. 4. For these measurements, the current was held at +10 nA for 2500 s to charge and the switched to open circuit for 5500 s. The voltage drop over this period indicates that the leakage current is non-zero.

EXAMPLES

Molar quantities of precursor components of Lithium nitrate ($LiNO_3$) and Boron trichloride ($BCl_3$) were measured and dissolved in ethanol to create a precursor solution of 0.025M. The solution pH was raised from pH 3 to pH 7 with ammonium hydroxide prior to deposition. Prior to utilization in the CCVD system (the deposition apparatus 10 schematically depicted in FIG. 1), the solution was placed in an ultrasonic bath for 20 minutes to ensure complete dissolution of solute and to eliminate agglomeration.

The solution was then deposited onto substrates using the deposition apparatus 10. During deposition, a magnetic stir bar was used to prevent solute particles from settling. Oxygen and methane in a 4:1 ratio provided the feed gas for the CCVD flame 24. The deposition time was held constant at 20 minutes for each sample. The deposition temperature was changed to produce multiple unique $LiBO_2$ films. The resulting $LiBO_2$ films were thus fabricated entirely in an ambient, or open air, environment. Each film was extensively characterized by scanning electron microscopy (SEM), impedance spectroscopy and Fourier transform infrared spectroscopy (FTIR).

Figure 8:
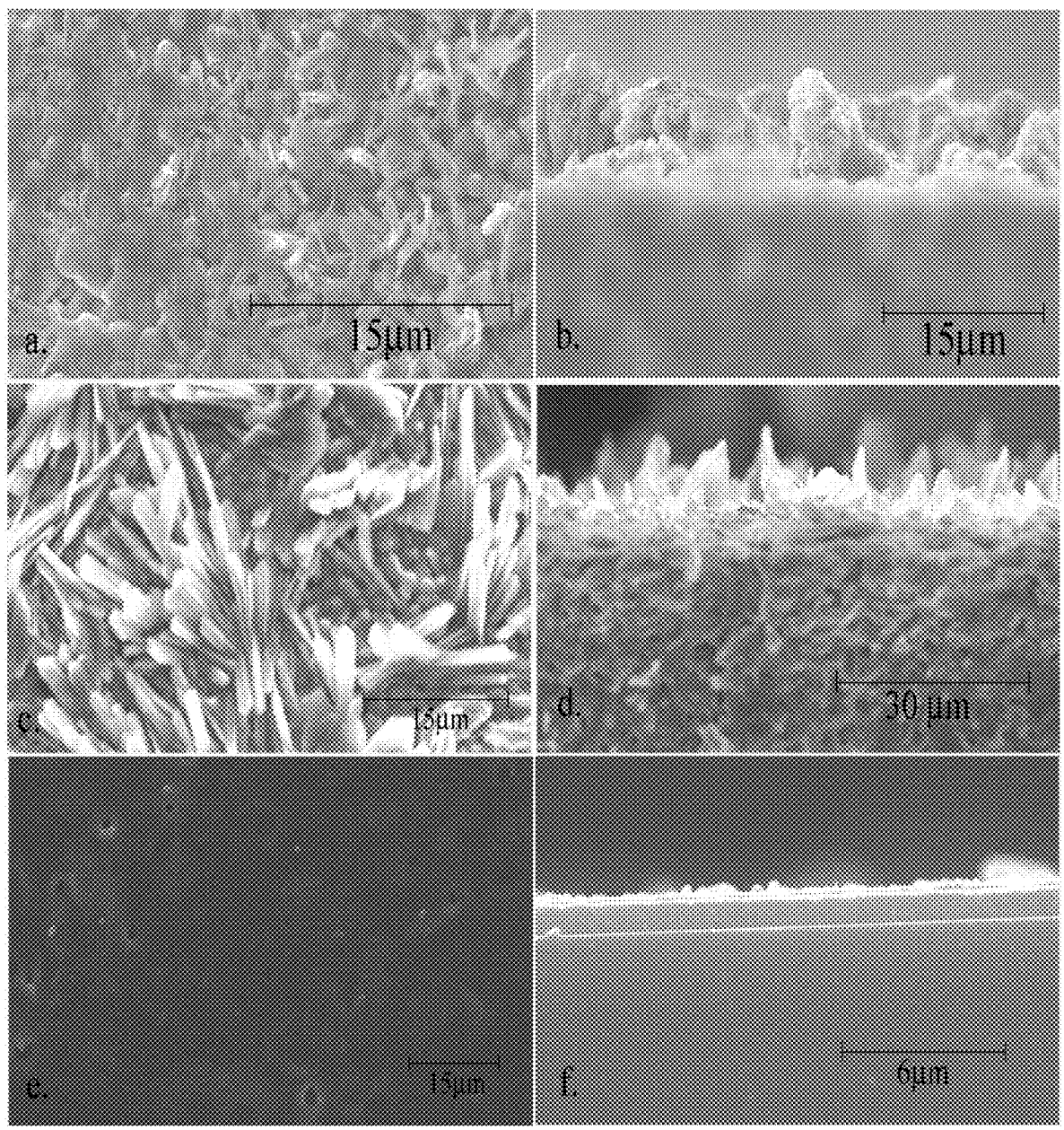
FIGS. 8a and 8b depict two SEM micrographs of $LiBO_2$ films developed via CCVD at fabrication temperatures of 500° C.
FIGS. 8c and 8d depict two SEM micrographs of $LiBO_2$ films developed via CCVD at fabrication temperatures of 750° C.
FIGS. 8e and 8f depict two SEM micrographs of $LiBO_2$ films developed via CCVD at fabrication temperatures of 900° C.

Following deposition, the thin film cells were imaged with Scanning Electron Microscopy (SEM) and evaluated with impedance spectroscopy. SEM images were taken using a Hitachi 4100 Field Emission Microscope. A thin carbon coating was deposited via RF sputtering prior to introduction into the vacuum chamber in order to reduce charging of the substrate during imaging. FIGS. 8 a-f present planar and cross-sectional SEM images of $LiBO_2$ thin films. The cell encompassed an active area of 2 mm×2 mm with a $LiBO_2$ electrolyte thickness of approximately 1 µm. FIGS. 8 (a-f) are SEM micrographs of the $LiBO_2$ films developed via CCVD at fabrication temperatures of 500° C. (FIGS. 8 a,b), 750° C. (FIGS. 8 c,d) and 900° C. (FIGS. 8 e,f).

The thin films of $LiBO_2$ were characterized using IR reflectance spectra. Infrared reflectance measurements were recorded with a Bomem DA3 spectrometer with an evacuated chamber and an MCT detector. A silicon carbide glowbar served as the beam source with a CaF2 beam splitter. The variable reflection angle was fixed at 30°, yielding a wavelength resolution of 4 $cm^{-1}$. Each IR spectra was compiled from 100 scans of the sample.

Figure 9:
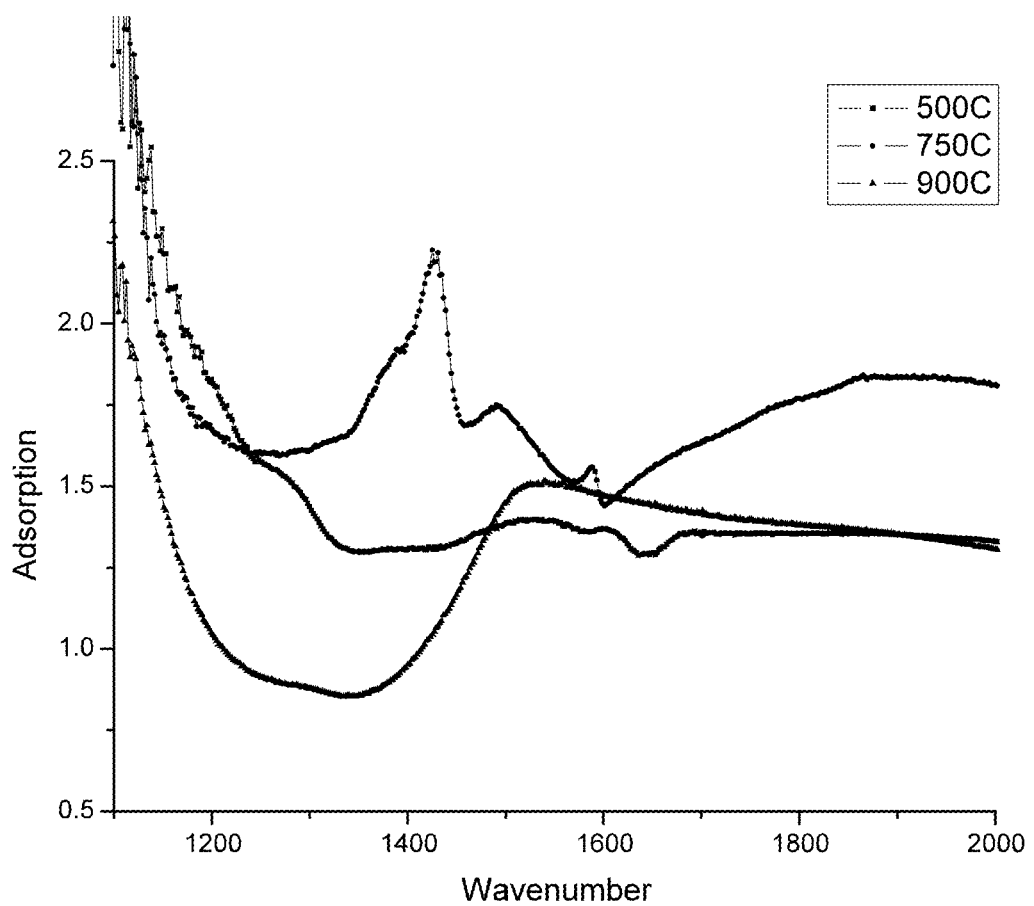
FIG. 9 depicts a first set of Fourier transform infrared spectroscopy ("FTIR") scans of $LiBO_2$ films fabricated at 500° C., 750° C. and 900° C.
Figure 10:
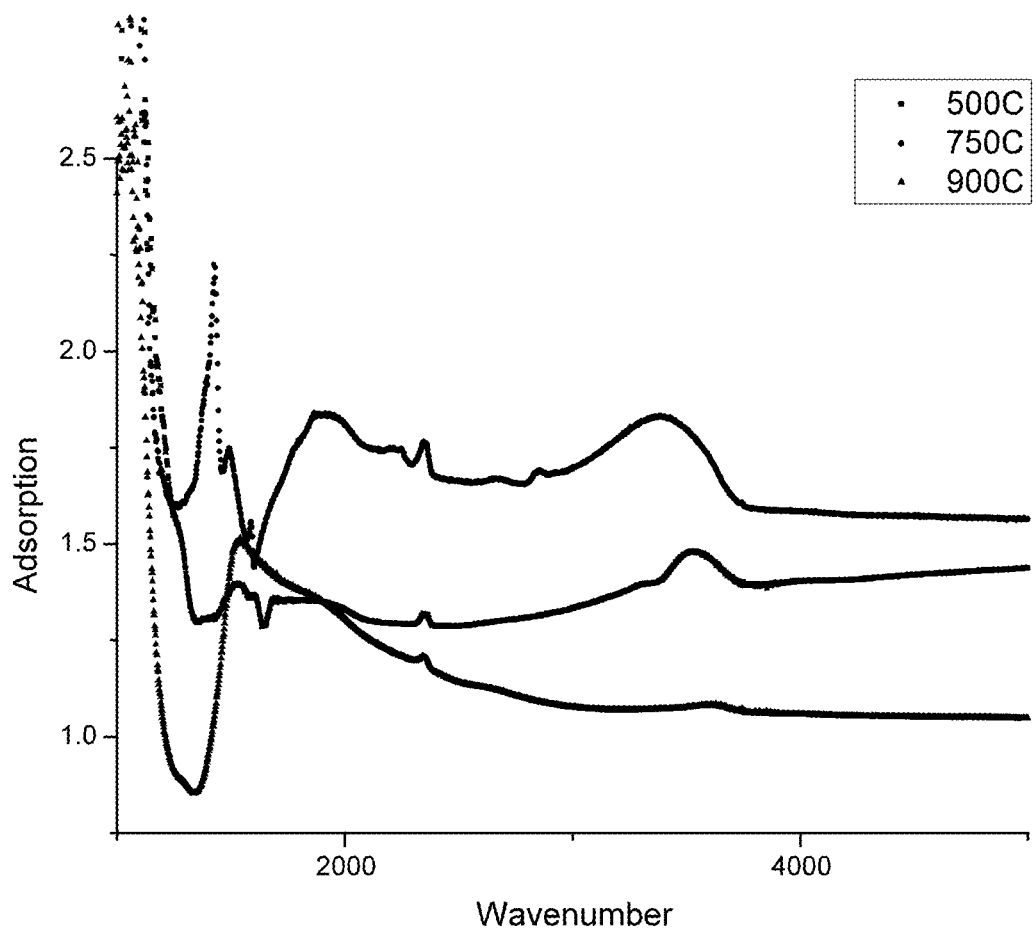
FIG. 10 depicts a second set of FTIR scans of $LiBO_2$ films fabricated at 500° C., 750° C. and 900° C.

The IR reflectance peaks for $LiBO_2$ films deposited at 500° C., 750° C. and 900° C. are displayed in FIGS. 9 and 10. Strong peaks at wavelengths of 1420 $cm^{-1}$, 1440 $cm^{-1}$ and 1590 $cm^{-1}$ are associated with the crystalline phase of α-$LiBO_2$. In FIG. 9, the films deposited at 750° C. show both a strong double peak at 1420 $cm^{-1}$ and 1440 $cm^{-1}$ and a secondary peak at 1590 $cm^{-1}$ indicating a large presence of crystalline α-$LiBO_2$. Films deposited at 500° C. showed similar peaks at 1420 $cm^{-1}$, 1440 $cm^{-1}$ and 1590 $cm^{-1}$, but with less intensity. This may be a result of a thinner film due to differences in deposition rates. Conversely, films deposited at 900° C. showed none of these peaks and more clearly reflected the spectrum for amorphous $LiBO_2$.

Changes in film thickness may be attributable to changes in the working distance during fabrication. To minimize the number of independent variables, flame conditions were held constant throughout the film fabrication process. As such, fabrication temperature was adjusted by moving the substrate nearer to or farther from the flame. Because the deposition geometry is roughly conical, deposition closer to the spray nozzle will result in a slightly higher deposition rate. It should be noted that the total change in position, between the nearest and furthest deposition positions, totaled 35 mm or roughly 10.3% of the total nozzle to substrate distance.

For electrochemical measurements, the $LiBO_2$ films were deposited atop a gold coated n-type silicon wafer. Silicon substrates were prepared by etching the native $SiBO_2$ layer in a 5% HF bath for 20 minutes. Once cleaned, substrates were immediately covered with gold on both sides using DC sputtering. Electrical measurements prior to $LiBO_2$ deposition confirmed a negligible resistance vertically through the Si wafer. The wafer was then diced and cleaned for deposition of the electrolyte. After $LiBO_2$ deposition, a matching Au electrode was sputtered atop the electrolyte for electrochemical testing.

$LiBO_2$ thin films were characterized electrochemically in air via impedance spectroscopy. Electrical contacts were made by placing the symmetric cell between two spring loaded platinum mesh electrodes. A computer interface controlling a Gamry PCI4-750 Potentiostat board and controller board collected data over a frequency range from 100 kHz to 1 mHz using a two-electrode configuration.

Impedance measurements of $LiBO_2$ films formed at 500° C. and 750° C. displayed a small real resistance of less than 1 ohm with an inductive component. This type of impedance spectra reflects a short circuit within the system, indicating that these layers were not sufficiently dense to prevent the positive electrode from touching the negative. Conversely, impedance spectrographs of $LiBO_2$ films deposited at 900° C. showed a single large interfacial polarization loop peaking near 7943 Hz with very little ohmic resistance.

Figure 11:
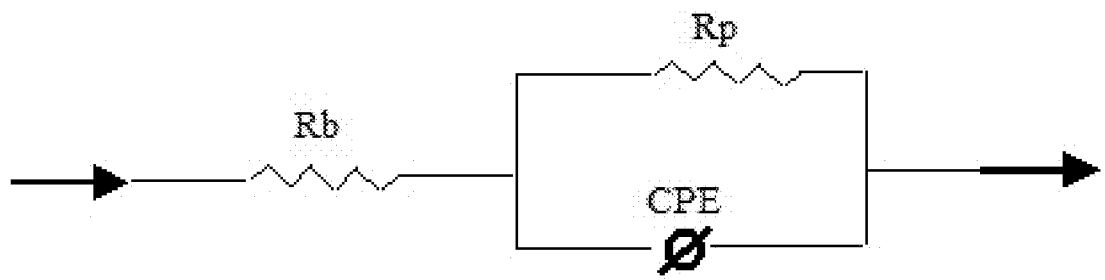
FIG. 11 depicts a schematic of the equivalent circuit used to model the impedance spectroscopy results presented in FIG. 12.
Figure 12:
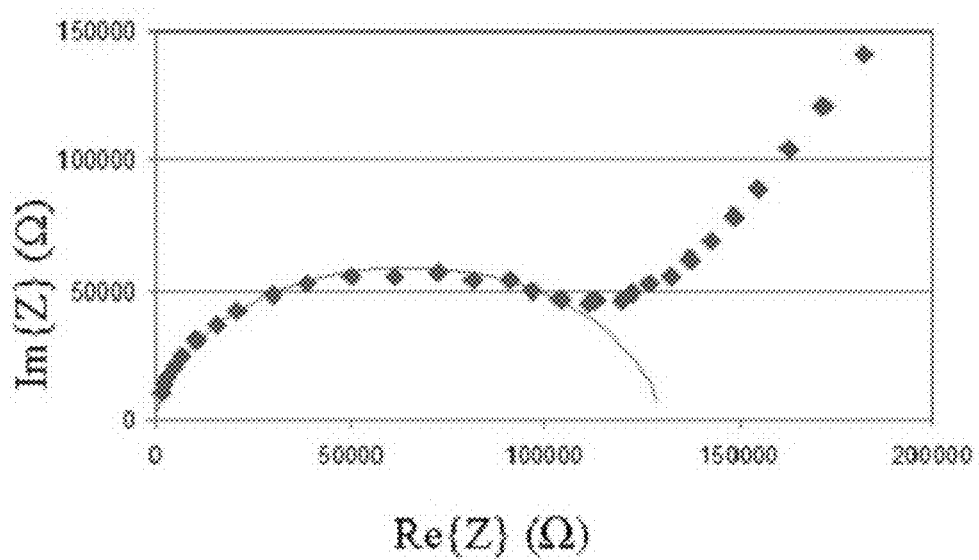
FIG. 12 depicts a characteristic impedance spectrograph of a $LiBO_2$ film at room temperature.

FIG. 12 is a characteristic impedance spectrograph of the $LiBO_2$ film at room temperature. This film was fabricated at 900° C. Because the impedance curve did not cross the real axis at low frequencies due to the onset of Warburg impedance, a simplified equivalent circuit simulation was used to estimate the polarization resistance, Rp. FIG. 11 presents a schematic of the equivalent circuit.

At room temperature, a total cell resistance of 1.3e5 ohms was recorded for a $LiBO_2$ cell of dimensions of 2 mm×1.5 mm×1.5 µm. The experimental conductivity of 3.84e-8 S/cm falls within published values for $LiBO_2$ of 3.18e-8 to 7.78e-7. The wide range in $LiBO_2$ ionic conductivity is a reflection of differing lithium contents implying that the $LiBO_2$ film developed here may be slightly lithium deficient. While the ionic conductivity of $LiBO_2$ falls below that for LiPON electrolytes of 2.3e-6 S/cm, the higher electrical resistivity 10-12 for $LiBO_2$ vs. 10-8-10-9 for LiPON, makes it a viable electrolyte material. A higher electrical resistivity means that thinner films can be used without shorting the system.

Thus, the present methods may be used to fabricate thin films of $LiBO_2$ using CCVD. At 500° C. and 750° C., the films may be porous and polycrystalline, but films deposited at 900° C. were amorphous and dense. The films were imaged with SEM, characterized with IR adsorption spectroscopy and electrochemically evaluated with impedance spectroscopy. $LiBO_2$ films developed at 900° C. showed a conductivity of 3.84e-8S/cm, well within the published range for this material In contrast to alternative methods for $LiBO_2$ fabrication, these films were developed in an open air environment. Two advantages of this method versus vacuum or controlled environment methods are cost and speed. By working in open air, up-front plant construction costs may be significantly reduced.

Most thin film batteries are more expensive than their liquid electrolyte counterparts because the fabrication process incurs non-trivial costs. Maintaining a high vacuum during fabrication is a time and energy intensive proposition. Multiple vacuum pumps, specialty materials and relatively small chamber sizes are needed to minimize outgassing and maintain a controlled environment. Moving from vacuum deposition to open air fabrication reduces these problems thereby significantly lowering the upfront plant costs. Because raw materials can make up 70-80% of the cost of a battery, few businesses are interested in such a low margin product. However, by significantly cutting the up-front costs, a much higher return on investment can be seen.

Furthermore, $LiBO_2$ electrolytes fabricated by CCVD have been developed at a deposition rate of roughly 400 Å/minute, more than two orders of magnitude faster than the average rates for CVD, PLD or sputtering systems. When pumpdown and system prep times are included, the deposition rate for traditional thin film methods falls even further. On the other hand, CCVD has already been developed as a continuous throughput system. By switching from a batch process to a continuous deposition process, output can be significantly increased, thereby improving the return on investment.

Therefore, the present method for fabricating an intercalated lithium battery without the assistance of a controlled environment comprises the following steps: (a) providing a substrate to serve as the negative electrode having at least one surface to be coated; (b) selecting a reagent and a carrier medium and mixing together said reagent and said carrier medium to form a reagent mixture, the reagent being selected such that at least a portion of the reagent forms a lithium boride coating; (c) spraying the reagent mixture through a nozzle to forms a liquid spray containing the reagent mixture; (d) passing said spray or vapor through a flame such that the reagent mixture is combusted; e) locating said substrate in a zone located relative to said liquid spray or vapor such that the surface temperature of the substrate is between 850° C. and 1000° C.; (e) removing said substrate from the flame following deposition; f) adhering a positive electrode to the coated surface of the substrate via hot pressing to form an intercalated lithium battery. The negative electrode may be a graphite film or Lithium cobaltite. The positive electrode may be a vanadium oxide film. The order in which the positive and negative electrodes are deposited may be switched.

Furthermore, the deposition method used may be combustion chemical vapor deposition. The carrier medium may be a liquid organic solvent. The reagent may be a gas, a vapor, or a liquid and said carrier is a gas, a vapor, or a liquid. The coating may comprise a combination of vapor deposited and spray pyrolysis deposited film of said reagent. The coating may also comprised spray pyrolysis deposited film of the reagent. The coating may be less than about 100 microns in thickness, or less than about 1 microns in thickness. The substrate may be heated predominately by the heat of combustion produced by combusting said reagent mixture, or by a secondary heat source. The deposition and irradiation typically occurs at a pressure between 10 torr and 10,000 torr.

The present methods have several advantages over prior methods. Although embodiments of the present methods have been described, various modifications and changes may be made by those skilled in the art without departing from the spirit and scope of the invention.

The invention claimed is:

1. An intercalated lithium ion battery made without the assistance of a controlled environment according to a process comprising the steps of:
   (a) providing a substrate to serve as the negative electrode having at least one surface to be coated;
   (b) forming a layer of amorphous LiBO2 (lithium metaborate) on the substrate by:
   mixing a solution of a combustible fluid with fluid-soluble lithium and boron compounds to dissolve the compounds in the fluid to form a reagent mixture
   spraying the reagent mixture through a nozzle to form a liquid spray containing the reagent mixture;

passing the spray through a flame to combust the reagent mixture, thereby forming heated lithium metaborate;

depositing the lithium metaborate onto the substrate at a temperature between 750C and 1100C to form an amorphous lithium metaborate coating on the substrate, the amorphous lithium metaborate layer thereby including carbon as a consequence of use of flame spray pyrolysis;

(c) removing the substrate from the flame following deposition; and (d) adhering a positive electrode configured to accept lithium ions to the coated substrate to form an intercalated lithium battery.

2. The battery of claim 1 wherein the electrolyte comprises dense LiBO2.

3. The battery of claim 1 wherein the lithium borate electrolyte is doped with at least one of phosphorous, sulfur or selenium.

4. The battery of claim 1 wherein the cathode material comprises at last one of LiNiCoAlO2 (NCA), LiNiCoMnO2 (NCM), LiFePO4 (LFP), LiMn2O4 (LMO), or LiCoO2 (LCO).

5. The battery in claim 1 wherein the anode material comprises at least one of graphite, graphene, carbon nanotubes, carbon nanopowder, or metallic lithium.

* * * * *